Patented Apr. 18, 1939

2,155,142

UNITED STATES PATENT OFFICE 2,155,142

COMPOUND GLASS

Howard W. Matheson, Montreal, Quebec, Canada

No Drawing. Application May 29, 1935, Serial No 24,130. In Great Britain May 30, 1934

11 Claims. (Cl. 49—92)

This invention relates to improvements in compound glass and in the process of making same and the object of the invention is to provide compound glass of improved shatter resistance, colour and transparency characteristics as compared with compound glass heretofore produced. A further object is to provide compound glass which is highly resistant to moisture and does not require sealing at the edges of the sheets.

The compound glass of my invention is composed of two or more sheets of glass and one or more intervening layers of a resinous material adhering to the glass with great tenacity. The resinous material is a condensation product of a partially or completely hydrolyzed polyvinyl ester characterized in that the degrees of condensation and hydrolysis and the viscosity of the polyvinyl ester lie within certain rather narrow limits hereinafter set forth.

Compound glass of the foregoing character is more shatter resistant, especially at low temperatures, than compound glass embodying layers of cellulose acetate or cellulose nitrate or mixtures composed mainly thereof. When colourless, transparent glass is used, the compound glass of my invention is initially substantially as colourless and transparent as the glass itself and does not become coloured or lose transparency with age or exposure to sunlight or heat. Moreover, where properly made, the glass of my invention remains free from blisters or bubbles, such as are commonly seen in compound glass on the market today, and which are due to separation of the glass sheets and the intervening cellulosic sheet.

The polyvinyl resinous materials preferably used are those derived from polyvinyl acetate having a viscosity of 10 centipoises or upwards, hydrolyzed to an extent of 70% or upwards and condensed with an aldehyde to the extent that the acetal reaction proceeds preferably to 90% of completion or more; but the percentage acetal reaction may be lower, for example in the neighbourhood of 80%. Resinous materials similarly derived from other polyvinyl esters, such as polyvinyl propionate and polyvinyl butyrate, may be used also. For the manner of producing these resins reference may be had to the application of Morrison and Price, Ser. No. 759,318, filed December 26th, 1934.

These resins may be used alone or admixed with plasticizers in amount up to 75 parts of plasticizer to 100 parts of resin depending upon the plasticizer and the resin. The plasticizers that may be used include: (i) dibutyl or diamyl phthalate or mixtures of either or both of these with diethyl or dimethyl phthalates; (ii) plasticizers now sold under the trade name of "Santicizers"; (iii) di- or tri-phenyl methane; (iv) the esters of glycerine such as di- or tri-acetin; (v) any mixtures of the above.

The resin may be mixed with a plasticizer and formed into sheets in any suitable way but the methods now preferred are:—

(a) the resin is mixed with the plasticizer and with a volatile solvent, such as a mixture of 20 parts of methyl alcohol and 80 parts of ethylene dichloride, after which the material is rolled, pressed into a block and sliced to a thickness $18/1000''$ to $30/1000''$ and seasoned for removal of the volatile solvent.

(b) The resin and plasticizer may be mixed with a volatile solvent as before in a mixer of standard type, such as a W. & P. mixer, and sheets of correct thickness are made on heated forming rolls. The sheets are then seasoned for removal of the volatile solvent.

(c) The resin and plasticizer may be mixed in any suitable way, preferably with addition of a volatile solvent and the material then put into an extrusion press and extended by heat and pressure to form a sheet of the proper thickness and width, the extruded sheet being conveyed away from the press on a moving conveyer and seasoned for removal of solvent.

No polishing of these sheets is necessary since, by reason of subsequently pressing the sheets between glass plates (as hereinafter described) a sufficiently smooth surface results, the material being sufficiently plastic for this purpose.

It is possible also to use the resin without a plasticizer and in this case the material may be mixed with a volatile solvent, rolled, pressed into a block and sliced and if desired polished. These sheets are then seasoned for removal of the volatile solvent.

Compound glass according to this invention is produced by pressing together, with heating, two sheets of suitable glass and an intervening sheet of resinous material as previously described until the resin adheres strongly to the glass. Pressures between 150 and 225 lbs. per square inch and temperatures between 225° and 300° F. may be used, depending on the time of treatment and on the resin and the amount of plasticizer therein and upon whether or not adhesives are used to facilitate adhesion of the resin and glass sheets. For practical reasons the time of treatment is preferably 7 to 15 minutes, but may be more or less. The temperature and pressure used depend largely upon the amount and nature of the plasticizer, the pressure and temperature being less when a large proportion of plasticizer is used than when a small proportion is used.

Suitable adhesion between the glass and resin sheets may be obtained without use of an adhesive but it is preferred to use an adhesive and this may be applied to the glass or to the resin sheet or to both. Adhesives now preferred are those prepared by dissolving a resin similar to that in the sheet, with or without a plasticizer, in a suitable solvent such as a mixture of methyl alcohol and ethylene dichloride, but any other suitable adhesive may be used. Such an adhesive solution preferably contains 8% to 10% of total solids and is sprayed in a thin film on the glass and/or on the resin sheet and the sheets then heated to expedite removal of the solvent. When an adhesive is used, the pressure, temperature and duration thereof must be such that the adhesive layer on the glass becomes amalgamated and virtually integral with the resin sheet or the adhesive coating thereon.

The following examples illustrate practice of the invention but it will be understood the invention is not limited in any way to the details of the examples.

Example I

One hundred parts of a resin made from polyvinyl acetate having a viscosity of 15 centipoises, in which 90% to 95% of the acidyl groups are replaced by reaction with formaldehyde, in which latter stage the acetal reaction has gone to about 90% of completion, is admixed with 30 to 35 parts of dibutyl phthalate, 6 parts of methyl alcohol and 24 parts of ethylene dichloride. Complete solution is effected in any suitable type of mixer such as a W. & P. or Banbury mixer. The material is formed into sheets by any of the methods previously described and seasoned for removal of the solvent, the preferable thickness of the sheet being approximately 25/1000 of an inch. A mixture of resin and plasticizer as above is made up in 10% solution in a solvent of the composition above described and is sprayed on one side of each of two sheets of glass and on each side of a sheet of the resin. The sheets are then heated for removal of the solvent. The sheets of glass and resin are brought together with the resin sheet intervening between the glass sheets and the coated surfaces of the glass contacting the coated resin sheet. The assembly is subjected to a pressure of 175 to 200 lbs. per square inch for 7 to 15 minutes while heating to a temperature of 250° to 275° F. The factors of time or pressure or temperature in securing proper adhesion of the sheets, or any two of them, may be reduced by appropriately increasing the other factor or factors as will be understood by those skilled in the art.

Example II

A sheet of resin and plasticizer mixture as in Example I is pressed between sheets of glass without use of the adhesive, the pressure, temperature and time of pressing being as in Example I or somewhat greater.

Example III

A sheet of resin as in Example I is made without admixture of any plasticizer and is pressed between sheets of glass without use of adhesive for approximately 15 minutes at a pressure of approximately 225 lbs. per square inch while heating to approximately 300° F.

Example IV

A resin sheet is made as in Example I excepting that the resin is made from polyvinyl acetate of 30 centipoises viscosity and the amount of plasticizer is increased to 50 parts. This sheet is incorporated with glass sheets according to the methods of any of Examples I, II or III, the pressure, heat and time of pressing being approximately the same as in the previous examples.

Compound glass produced according to any of the foregoing examples is shatter resistant to a very high degree, and is more so than compound glass made using cellulose acetate or cellulose nitrate, especially at low temperatures, for example 0° to 10° F., at which the impact strength of the sheet is greater than that of cellulose acetate or nitrate sheets, this being due to the great toughness and high impact resisting strength of the resin sheet and the tenacious adherence of the resin to the glass. The colour of the compound glass is not affected by age or sunlight nor does blistering occur. Prolonged heating of the resin at 125° C. does not produce any discolouration. Resins made from polyvinyl acetates of viscosities other than given in the examples may be used. If the viscosity is below 10 centipoises, the impact strength of the resin is found to be not sufficiently good for the purposes of this invention. The higher the viscosity of the polyvinyl ester, the greater is the impact strength and toughness of the resin and the more desirable it is for the purposes of this invention. Resin sheets of the character described have greater impact strength than sheets of equal thickness composed of cellulose acetate or cellulose nitrate or mixtures being mainly cellulose acetate or nitrate.

An important advantage of the compound glass of my invention is that the resin is highly resistant to water and does not absorb same to nearly the same extent as cellulose acetate or nitrate sheets and in consequence the edges of my compound glass do not require to be and ordinarily are not sealed against entrance of aqueous moisture as is necessary with compound sheets containing cellulose acetate or nitrate. This is especially true of sheets in which the resin used has been made by carrying the acetal reaction to or above 90%.

While the compound glass of my invention ordinarily comprises only two sheets of glass and the intervening resinous material, it may comprise more than two sheets of glass or more than one intervening resinous sheet.

Another important advantage of this invention is that, when a compound sheet made in accordance therewith receives a heavy blow, as from a flying object, the sheet does not break, even though the glass itself is fractured into innumerable pieces, but merely bags, thus affording a high degree of protection.

Having thus described my invention what I claim is:

1. Compound glass comprising a plurality of sheets of glass and a sheet of a polyvinyl resin between each two adjacent sheets of glass, the said resin sheet including a resin produced from a polyvinyl ester having a viscosity above 10 centipoises and which has been hydrolyzed to an extent of at least 70% and condensed with an aldehyde until the acetal reaction has proceeded to at least approximately 80% of completion.

2. Compound glass comprising a plurality of sheets of glass and a sheet of a polyvinyl resin between each two adjacent sheets of glass and layers of adhesive material between the sheets of glass and resin and connecting the said sheets together, the said resin sheet including a resin produced from a polyvinyl ester having a viscosity above 10 centipoises and which has been hydrolyzed to an extent of at least 70% and condensed with an aldehyde until the acetal reaction has proceeded to at least approximately 80% of completion.

3. Compound glass according to claim 2 in which the composition of the adhesive layers is substantially the same as the composition of the resin.

4. Compound glass comprising a plurality of sheets of glass and a sheet of material between each two adjacent sheets of glass comprising a mixture of a polyvinyl resin and a plasticizer, the said resin being that produced from a polyvinyl ester having a viscosity above 10 centipoises and which has been hydrolyzed to an extent of at least 70% and condensed with an aldehyde until the acetal reaction has proceeded to at least approximately 80% of completion.

5. Compound glass according to claim 4 including layers of adhesive material between the sheets of glass and resin mixture, the said adhesive material being a mixture of a polyvinyl resin and a plasticizer.

6. A shatter resisting glass structure comprising a plurality of sheets of glass and at least one layer of material between and adhering to each two adjacent sheets of glass and consisting essentially of a polyvinyl resin produced from a polyvinyl ester having a viscosity above 10 centipoises and which has been hydrolyzed to an extent of at least 70% and condensed with an aldehyde until the acetal reaction has proceeded to at least approximately 80% of completion.

7. A shatter resisting glass structure comprising a plurality of sheets of glass and at least one layer of material between and adhering to each two adjacent sheets of glass and consisting essentially of a polyvinyl resin and a plasticizing agent for said resin, said resin being produced from a polyvinyl ester having a viscosity above 10 centipoises and which has been hydrolyzed to an extent of at least 70% and condensed with an aldehyde until the acetal reaction has proceeded to at least approximately 80% of completion.

8. A shatter resisting glass structure comprising a plurality of sheets of glass and at least one layer of material between and adhering to each two adjacent sheets of glass and consisting essentially of a polyvinyl resin produced from a polyvinyl ester having a viscosity above 10 centipoises and which has been hydrolyzed to an extent of at least 70% and condensed with formaldehyde until the acetal reaction has proceeded to at least approximately 80% of completion.

9. A shatter resisting glass structure comprising a plurality of sheets of glass and at least one layer of material between and adhering to each two adjacent sheets of glass and consisting essentially of a polyvinyl resin and a plasticizing agent for said resin, said resin being produced from a polyvinyl ester having a viscosity above 10 centipoises and which has been hydrolyzed to an extent of at least 70% and condensed with formaldehyde until the acetal reaction has proceeded to at least approximately 80% of completion.

10. A shatter resisting glass structure comprising a plurality of sheets of glass and at least one layer of resinous material between and adhering to adjacent sheets of glass and including a polyvinyl acetal resin produced from a polyvinyl ester having a viscosity of at least 10 centipoises which has been hydrolyzed to an extent of at least 70% and condensed with formaldehyde until the acetal reaction has proceeded to at least approximately 80% of completion; and a plasticizer for said resin selected from the group consisting of dibutyl and diamyl phthalates, diphenyl and triphenyl methane, diacetin and triacetin.

11. A shatter resisting glass structure comprising a plurality of sheets of glass and at least one layer of material between and adhering to each two adjacent sheets of glass and consisting essentially of a polyvinyl resin produced from a polyvinyl ester having a viscosity above 10 centipoises and which has been hydrolyzed to an extent of at least 70% and condensed with an aldehyde until the acetal reaction has proceeded to approximately 80% of completion, the edge portions of said structure being characterized by absence of waterproof edge sealing and by exposure of the edge portions of the said layer of material to the atmosphere.

HOWARD W. MATHESON.